3,053,692
PROTECTIVE COATING
Walter E. Pocock, Baltimore, Md., assignor to Allied Research Products, Incorporated, Baltimore, Md., a corporation of Maryland
No Drawing. Filed Jan. 29, 1958, Ser. No. 711,778
17 Claims. (Cl. 117—75)

This invention relates to the treatment of metals to provide the same with a protective corrosion resistant and abrasion resistant coating which also has excellent paint bonding characteristics and more particularly to an improved coating composition and method for forming the coating.

A simplified flow diagram of the process is as follows:

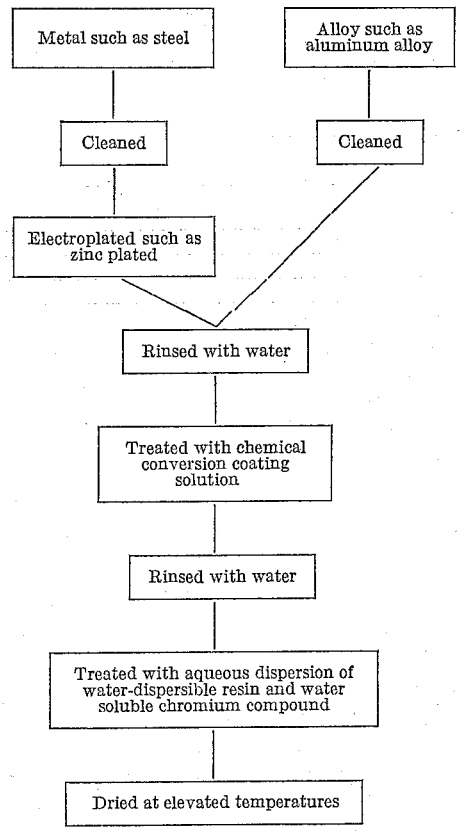

Previously used organic coatings necessitate the use of organic solvents and where water soluble resins are used, lack the corrosion protective value, wide range of surfaces which can be successfully coated, and adhesion characteristics covered in this invention.

An object of this invention is to provide metals such as steel, aluminum, zinc, cadmium, magnesium, silver, copper, copper alloys, etc., and chemical conversion coatings, e.g., chromate and oxide coatings, on these metals with a clear abrasion resistant and corrosion protective film, which can be used as a final finish and which provides an excellent base for subsequent painting.

A particular object of this invention is to provide these advantageous characteristics from an aqueous dispersion containing a polymer or polymers coupled with a corrosion inhibitor or inhibitors operated at room temperature up to 200° F. and applied to the metal surface by dip, brush or spray. It is possible by use of this invention to use organic and inorganic coloring agents to provide color to the film.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

With the above objects in view, the invention consists in the improved coating, composition, and method of forming coatings which are thereinafter described and more particularly defined by the accompanying claims.

The principal components of the coating, which form the subject of the present invention, consist of a water-dispersible resin and a corrosion inhibitor or inhibitors.

The water-dispersible resin is chosen from the group of aqueous vinyl acetate resin emulsions, aqueous vinyl chloride resin emulsions and aqueous vinylidene chloride resin emulsions. The vinyl chloride resins include polyvinyl chloride and copolymers of vinyl chloride with a minor amount of a copolymerizable material such as vinyl acetate, vinylidene chloride, dimethyl maleate, diethyl maleate, vinyl methyl, ether, methyl acrylate, etc. The vinylidene chloride resins include polyvinylidene chloride and copolymers of vinylidene chloride with a minor amount of a copolymerizable material such as vinyl chloride, acrylonitrile, ethyl acrylate, methyl acrylate, dimethyl maleate and methyl methacrylate.

The emulsion also normally includes a small amount of wetting or dispersing agent, e.g., polyvinyl alcohol, sodium lauryl sulfate, sodium decyl benzene sulfonate, sodium dodecyl benzene sulfonate, dioctyl sodium sulfosuccinate, alkyl aryl polyether alcohol (Triton X-100), sodium salt of an alkyl aryl polyether sulfate (Triton 770), etc. Generally, about 1% of the dispersing agent is employed on a dry solids basis.

The compositions of the present invention can be used to apply corrosion-resistant coatings to metals such as aluminum, steel, iron, zinc, silver, cadmium, magnesium, copper, copper alloys, etc.

The preferred corrosion inhibitor, or inhibitors, used in this invention are water soluble chromium compounds such as sodium, potassium, ammonium chromate, and dichromate, as well as less soluble complex chromium chromate gels containing both hexavalent and trivalent chromium made, for example, by adding sodium chromate to chromium nitrate under slightly alkaline conditions and very slightly soluble chromium compounds such as zinc chromate and strontium chromate. Such compounds are excellent corrosion inhibitors when used in conjunction with the water dispersable resins in accomplishing the scope of the invention.

The aqueous emulsion compositions of the present invention can be employed at various pH values, e.g., at a pH on the acid side which will not break the emulsion up to 11. A pH of about 4 appears to be a practical lower limit although in some cases even a lower pH might be employed or a higher pH might be necessary.

The operating conditions for the aqueous emulsions which are employed are as follows, all parts and percentages being by weight unless otherwise specified.

| | Working Range | Preferred Range |
|---|---|---|
| Resin solids, percent | 1 to 15 | 5 to 10. |
| Emulsion temperature, °F | 60 to 200 | 70 to 100. |
| Emulsion pH | 4 to 11 | 6 to 7.5. |
| Drying temperature (vinyl chloride and vinylidene chloride resins), °F | 120 to 250 | 140 to 160. |
| Drying temperature (polyvinyl acetate), °F | 200 to 350 | 250 to 300. |

The vinyl acetate resins, vinyl chloride resins and vinylidene chloride resins are available commercially as emulsions having a solids content of up to 55%. Such commercial emulsions are then diluted with water to prepare the compositions having 1 to 15% solids which are employed in the instant invention. A preferred vinyl chloride copolymer emulsion is Polyco 446-S, manufactured by the Borden Company, having 44% solids.

A preferred polyvinyl acetate emulsion is Elvacet 84–1100 manufactured by E. I. du Pont de Nemours and Co., having 55% solids.

A preferred vinylidene chloride polymer emulsion is Polyco 453, manufactured by the Borden Company, having 45% solids.

When the chromate corrosion inhibitor is used in admixture with the emulsion of the polymeric compound, there is employed 0.01 to 10 parts of inhibitor, preferably 0.05 to 0.5 part, per 100 parts of water. The inhibitor can be used in excess of 10 parts per 100 parts of water, but there is generally no advantage in doing so which justifies the increase in expense.

Additionally, the coatings of the instant invention serve to improve the bonding of paint to the metal surface.

It will be appreciated by those skilled in the art that mixtures of two or more resin emulsions can be employed, e.g., a mixture of vinyl chloride resin emulsion and vinylidene chloride resin emulsion.

The compositions can be applied to metals by dip, brush or spray procedures.

*Example 1*

A zinc plated steel test panel was immersed in an aqueous dispersion, at 80° F., of a vinyl chloride resin ("Polyco" 446-S) having a resin content of 5% and sodium chromate 0.2% and a pH of about 8, and dried at 160° F. A clear abrasion resistant coating was formed. The corrosion resistance of the test panel was markedly improved in comparison to a similar panel that had been zinc plated only, as indicated by a standard 20% salt spray test.

*Example 2*

Similar results to those of Example 1 were obtained when the Polyco 446-S was replaced by an equal weight of Polyco 453, a vinylidene chloride resin emulsion.

*Example 3*

Similar results to those of Example 1 were obtained when the Polyco 446-S was replaced by Elvacet 84–1100, a polyvinyl acetate resin emulsion, in such amount as to give the same resin solids content, and the drying temperature was increased to 250° F.

*Example 4*

Example 1 was repeated except using double the concentrations specified. Results were similar to those of Example 1, except that there was a further increase in corrosion resistance.

*Example 5*

A steel panel was cleaned, immersed in the solution of Example 1 and dried at 160° F. A clear abrasion resistant coating was formed. The corrosion resistance of the panel was markedly greater than that of a similar panel that had been cleaned only, as indicated by standard 20% salt spray test.

*Example 6*

A panel of 2024–T3 alloy aluminum was cleaned, immersed in the solution of Example 1, and dried at 160° F. A clear abrasion resistant coating was formed. The corrosion resistance of the panel was markedly greater than that of a similar panel that had been cleaned only, as indicated by standard 20% salt spray test.

*Example 7*

A cadmium plated steel test panel was subjected to the following procedure:

(1) Immerse for 30 seconds at 80° F. in:

Sodium bichromate, $Na_2Cr_2O_7 \cdot 2H_2O$ _____ grams__ 40
Formic acid, 24° Bé _____ ml__ 60
Zinc nitrate _____ grams__ 10
Water to make 1 liter.

(2) Rinse with water.
(3) Immerse in the solution of Example 1.
(4) Dry at 160° F.

Step 1 forms a chromate conversion film in accordance with Thomas et al., U.S. Patent No. 2,393,663.

Steps 3 and 4 formed a clear abrasion resistant coating. The corrosion resistance of the panel was greater than that of a similar panel treated by steps 1, 2, and 4 only, as indicated by standard 20% salt spray.

*Example 8*

A zinc plated steel test panel was subjected to the following procedure:

(1) Immerse for 30 seconds at 80° F. in:

Chromic acid, $CrO_3$ _____ grams__ 80
Glacial acetic acid _____ ml__ 55
Sulfuric acid, 98% _____ ml__ 5
Nitric acid, 70% _____ ml__ 10
Water to make 1 liter.

(2) Rinse with water.
(3) Immerse in the solution of Example 1.
(4) Dry at 160° F.

Step 1 forms a bright chromate conversion film.

Steps 3 and 4 formed a clear abrasion resistant coating. The corrosion resistance of the panel was markedly greater than that of a similar panel treated by steps 1, 2, and 4 only, as indicated by standard 20% salt spray test.

*Example 9*

A copper test panel was cleaned, immersed in the solution of Example 1, and dried at 160° F. A clear abrasion resistant coating was formed. The corrosion resistance of the panel was markedly greater than that of a similar panel that had been cleaned only, as indicated by standard 20% salt spray test.

*Example 10*

A test panel of FS–1 alloy magnesium was alkaline cleaned, pickled to remove oxide, rinsed, immersed in the solution of Example 1, and dried at 160° F. A clear abrasion resistant coating was formed. The corrosion resistance of the panel was markedly greater than that of a similar panel that had been cleaned and pickled only, as indicated by standard 20% salt spray test.

*Example 11*

Zinc metal sheet was dipped into an aqueous solution containing:

Chromic acid $(CrO_3)$ _____ 70 grams/liter.
Sodium sulfate _____ 10 grams/liter.
Nitric acid, 42° Bé _____ 30 ml./liter.

The sheet was allowed to remain in the solution until a visible conversion coating was formed (about 15 seconds). The sheet was then removed, rinsed in water and immersed in an aqueous dispersion containing vinyl chloride resin 5%.

The sheet was dried at 160° F., whereupon a clear coating was formed having abrasion resistance superior to that of the chromate conversion coating itself.

We have found that an aqueouse solution of an alkali soluble resin, in which ammonia is used to effect the solution is boiled or subjected to prolonged heating, the ammonia is gradually driven off. The resin then re-precipitates to form an emulsion, from which coating can be formed in the same way as from the emulsions of alkali-insoluble vinyl acetate, vinyl chloride, and vinylidene chloride recited in the foregoing example.

*Example 12*

A solution was prepared of the following composition:

Alkali-soluble vinyl acetate resin
(Lemac 541–10) _____ 5%.
30% ammonium hydroxide_____ 0.5% (by volume).
Sodium chromate, $Na_2CrO_4$_____ 0.2%.
Water _____ Remainder.

This solution was then boiled for 2 hours to remove the ammonium hydroxide. The resin precipitated to form an emulsion which did not settle out.

A zinc plated steel test panel was immersed in this aqueous dispersion at 80° F. and then dried at 160° F. A clear abrasion resistant coating was formed.

What is claimed is:

1. An aqueous emulsion consisting essentially of water, 0.01 to 10 parts of hexavalent chromium corrosion inhibitor, and 1 to 15 parts of a polymeric compound selected from the group consisting of water insoluble vinyl acetate resins, vinyl chloride resins, and vinylidene chloride resins per 100 parts of said water.

2. An aqueous emulsion according to claim 1 having a pH of 6 to 7.5.

3. A composition according to claim 1 wherein the polymeric compound is a vinyl acetate resin.

4. A composition according to claim 1 wherein the polymeric compound is a vinyl chloride resin.

5. A composition according to claim 1 wherein the polymeric compound is a vinylidene chloride resin.

6. A method of imparting a clear, corrosion resistant coating to a metal which comprises subjecting the metal to an aqueous emulsion consisting essentially of water as the sole solvent, a hexavalent chromium compound corrosion inhibitor, and a polymeric compound selected from the group consisting of water insoluble vinyl acetate resins, water insoluble vinyl chloride resins, and water insoluble vinylidene chloride resins.

7. A method according to claim 6 in which the aqueous emulsion has a pH of 6 to 7.5.

8. A method according to claim 6 wherein the polymeric compound is used in an amount of 10 to 150 grams per liter of solution and the hexavalent chromium compound is used in an amount of 0.1 to 100 grams per liter of solution.

9. A method according to claim 6 wherein the metal has an initial hexavalent chromium compound corrosion inhibiting conversion coating and the aqueous emulsion of the polymeric compound and corrosion inhibitor is applied over said initial coating.

10. A method according to claim 9 wherein the polymeric compound is used in an amount of 10 to 150 grams per liter of solution and the hexavalent chromium compound is used in an amount of 0.1 to 100 grams per liter of solution.

11. A method of imparting increased abrasion resistance to a metal having initially a corrosion-resistant chromate conversion coating comprising subjecting the metal having said initial coating to an aqueous emulsion consisting essentially of water and a polymeric compound selected from the group consisting of water insoluble vinyl acetate resins, vinyl chloride resins and vinylidene chloride resins.

12. A method according to claim 11 wherein the polymeric compound is a water insoluble vinyl acetate resin present in an amount of 10 to 150 grams per liter of emulsion.

13. A method according to claim 11 wherein the polymeric compound is a vinyl chloride resin present in an amount of 10 to 150 grams per liter of emulsion.

14. A method according to claim 11 wherein the polymeric compound is a vinylidene chloride resin present in an amount of 10 to 150 grams per liter of emulsion.

15. A method of imparting a clear, corrosion-resistant coating to a metal which comprises subjecting the metal to an aqueous emulsion consisting essentially of water as the sole solvent, a hexavalent chromium compound corrosion inhibitor and a polymeric compound selected from the group consisting of water insoluble vinyl acetate resins, water insoluble vinyl chloride resins and water insoluble vinylidene chloride resins and drying the coated metal.

16. A method according to claim 15 wherein the metal has an initial chromate corrosion-inhibiting conversion coating and the aqueous emulsion of the polymeric compound and corrosion inhibitor are applied over said initial coating.

17. A method of imparting increased abrasion resistance to a metal having an initial coating containing a chromate corrosion inhibitor comprising subjecting the metal having said initial coating to an aqueous emulsion consisting essentially of water as the sole solvent and a polymeric compound selected from the group consisting of water insoluble vinyl acetate resins, vinyl chloride resins and vinylidene chloride resins and thereafter drying.

References Cited in the file of this patent

UNITED STATES PATENTS

| | | |
|---|---|---|
| 2,125,387 | Mason | Aug. 2, 1938 |
| 2,385,800 | Douty et al. | Oct. 2, 1945 |
| 2,411,590 | Powell | Nov. 26, 1946 |
| 2,562,119 | Haon | July 24, 1951 |
| 2,567,108 | Hochberg | Sept. 4, 1951 |
| 2,902,390 | Bell | Sept. 1, 1959 |
| 2,904,523 | Hawkins et al. | Sept. 15, 1959 |
| 2,921,858 | Hall | Jan. 19, 1960 |
| 2,930,106 | Wrotnowski | Mar. 29, 1960 |